(12) United States Patent
Fleming et al.

(10) Patent No.: US 9,038,414 B2
(45) Date of Patent: May 26, 2015

(54) METHODS AND APPARATUSES FOR STEERING FLEXIBLE GLASS WEBS

(71) Applicant: Corning Incorporated, Corning, NY (US)

(72) Inventors: Todd Benson Fleming, Elkland, PA (US); Richard Jonathan Kohler, Hilton, NY (US); Dale Charles Marshall, Brockport, NY (US); Robert L Walton, Fairport, NY (US)

(73) Assignee: Corning Incorporated, Corning, NY (US)

( * ) Notice: Subject to any disclaimer, the term of this patent is extended or adjusted under 35 U.S.C. 154(b) by 290 days.

(21) Appl. No.: 13/627,455

(22) Filed: Sep. 26, 2012

(65) Prior Publication Data
US 2014/0083137 A1  Mar. 27, 2014

(51) Int. Cl.
C03B 17/06    (2006.01)
C03B 35/24    (2006.01)
B65H 23/02    (2006.01)
C03B 33/02    (2006.01)
C03B 33/09    (2006.01)

(52) U.S. Cl.
CPC .............. C03B 35/246 (2013.01); B65H 23/02 (2013.01); B65H 23/0204 (2013.01); B65H 23/0212 (2013.01); B65H 2404/511 (2013.01); B65H 2406/1115 (2013.01); B65H 2801/61 (2013.01); C03B 33/0215 (2013.01); C03B 33/091 (2013.01); C03B 17/064 (2013.01)

(58) Field of Classification Search
CPC .... C03B 35/24; C03B 35/243; C03B 35/246; B65H 24/24
See application file for complete search history.

(56) References Cited

U.S. PATENT DOCUMENTS

| 3,622,298 | A | * | 11/1971 | Machlan et al. | 65/31 |
| 3,977,858 | A | * | 8/1976 | Taguchi | 65/158 |
| 4,268,296 | A | * | 5/1981 | Pfaender | 65/90 |
| 4,330,909 | A | | 5/1982 | Peschke et al. | 26/75 |
| RE31,442 | E | * | 11/1983 | Pfaender | 65/90 |
| 4,480,777 | A | | 11/1984 | Suzuki et al. | 226/15 |
| 4,865,638 | A | | 9/1989 | Kudo | 65/273 |
| 5,087,313 | A | | 2/1992 | Duecker | 156/271 |
| 5,515,139 | A | | 5/1996 | Hou et al. | 355/208 |
| 5,554,262 | A | * | 9/1996 | Turner | 162/198 |
| 5,794,500 | A | | 8/1998 | Long et al. | 83/22 |

(Continued)

FOREIGN PATENT DOCUMENTS

CN    101778787 A    7/2010 ............ B65G 51/03
EP    0699968 A1 *  3/1996

(Continued)

*Primary Examiner* — Jason L Lazorcik
(74) *Attorney, Agent, or Firm* — Kevin M. Able

(57) ABSTRACT

Methods and apparatuses for steering flexible glass webs are disclosed. In one embodiment, a steering device for non-contact steering of a glass web having a conveyance direction and a cross direction normal to the conveyance direction includes a fluid injection bar having an elongate axis oriented in a cross direction of the glass web. The steering device also includes a pivot bearing assembly coupled to the fluid injection bar such that the fluid injection bar is pivotable in a plane perpendicular to the conveyance direction of the glass web, an actuator coupled to the fluid injection bar for adjusting the orientation of the fluid injection bar with respect to the glass web, and an edge detection device positioned proximate to an edge of the glass web for evaluating a position of an edge of the glass web.

9 Claims, 4 Drawing Sheets

(56) References Cited

U.S. PATENT DOCUMENTS

| | | | |
|---|---|---|---|
| 6,092,392 A * | 7/2000 | Verlinden et al. | 65/30.1 |
| 2005/0098680 A1 * | 5/2005 | Naruoka et al. | 242/615.12 |
| 2011/0177290 A1 * | 7/2011 | Tomamoto et al. | 428/142 |
| 2011/0177325 A1 * | 7/2011 | Tomamoto et al. | 428/332 |
| 2011/0192878 A1 * | 8/2011 | Teranishi et al. | 226/1 |
| 2011/0197633 A1 * | 8/2011 | Tomamoto et al. | 65/94 |
| 2011/0197634 A1 * | 8/2011 | Eta | 65/97 |
| 2011/0198378 A1 * | 8/2011 | Chang et al. | 226/7 |
| 2011/0200812 A1 * | 8/2011 | Tomamoto et al. | 428/220 |
| 2011/0217521 A1 * | 9/2011 | Teranishi et al. | 428/189 |
| 2011/0223386 A1 * | 9/2011 | Tomamoto et al. | 428/156 |
| 2012/0090357 A1 * | 4/2012 | Nakamura et al. | 65/95 |
| 2012/0111054 A1 * | 5/2012 | Blanding et al. | 65/25.4 |
| 2012/0131955 A1 * | 5/2012 | Kuroiwa et al. | 65/24 |
| 2012/0247154 A1 * | 10/2012 | Abramov et al. | 65/54 |
| 2012/0255672 A1 * | 10/2012 | Marshall et al. | 156/216 |
| 2012/0318024 A1 * | 12/2012 | Mori et al. | 65/90 |
| 2013/0134202 A1 * | 5/2013 | Garner et al. | 226/6 |
| 2014/0144753 A1 * | 5/2014 | Huang et al. | 198/610 |

FOREIGN PATENT DOCUMENTS

| | | | |
|---|---|---|---|
| EP | 0710531 a1 * | 5/1996 | |
| KR | 201000074278 A | 1/2012 | B65G 49/06 |

* cited by examiner

METHODS AND APPARATUSES FOR STEERING FLEXIBLE GLASS WEBS

BACKGROUND

1. Field

The present specification generally relates to apparatuses and methods of steering and/or conveying flexible glass webs and, more specifically, to non-contact apparatuses and methods used to steer flexible glass webs during manufacturing.

2. Technical Background

Thin, flexible glass webs can be used in various applications, including so-called "e-paper," color filters, photovoltaic cells, displays, OLED lighting, and touch sensors. The glass for such substrates can be quite thin, typically less than about 0.3 mm. The processing of the substrates can be performed on an individual glass sheet basis, or most efficiently, by conveying the substrate as a long glass web, which can be wound on a roll or spool. Such methods include dispensing the ribbon from one roll, processing the dispensed portion, then re-winding the ribbon onto a take-up roll. Alternatively, the glass web can be singulated into discrete components or sheets instead of the final re-winding onto a take-up roll.

One drawback to a so-called "roll-to-roll" process is the brittleness of the thin glass web. Specifically, mechanical contact of the ribbon during handling can lead to damage, including scratches, chipping, and fracture. Further, misalignment of the glass web during manufacturing processes or during transportation is generally undesirable for purchasers of the glass web.

Accordingly, there is a need for apparatuses and methods to steer the glass webs as the glass webs are conveyed through the manufacturing operations.

SUMMARY

The embodiments described herein relate to apparatuses and methods of steering flexible glass webs in a lateral direction while the glass webs are conveyed along a manufacturing line. The steering device steers the glass web without contacting the glass web itself. Specifically, the methods and apparatuses described herein compensate for misalignment of equipment or twist in the glass web to maintain the position of the glass web in the manufacturing equipment.

In some embodiments, a steering device for non-contact steering of a glass web having a conveyance direction and a cross direction normal to the conveyance direction includes a fluid injection bar having an elongate axis oriented in a cross direction of the glass web. The steering device also includes a pivot bearing assembly coupled to the fluid injection bar such that the fluid injection bar is pivotable in a plane perpendicular to the conveyance direction of the glass web, an actuator coupled to the fluid injection bar for adjusting the orientation of the fluid injection bar with respect to the glass web, and an edge detection device positioned proximate to an edge of the glass web for evaluating a position of an edge of the glass web.

In other embodiments, a method of steering a glass web includes directing the glass web along a glass manufacturing apparatus in a conveyance direction, where the glass web includes a cross direction normal to the conveyance direction. The method also includes conveying the glass web over a steering device, where the steering device comprising a pivotable fluid injection bar and an edge detection device positioned proximate to an edge of the glass web. The method further includes determining a lateral position of an edge of the glass web, calculating automatically with at least one processor the lateral position of the glass web based on a signal from the edge detection device, and pivoting the fluid injection bar of the steering device to shift the glass web in an inward direction when the edge detection device senses that the edge of the glass web is positioned outwardly offset from a pre-determined set point.

In yet other embodiments, a method for producing a glass web includes melting glass batch materials to form molten glass and forming the molten glass into the glass web with a fusion draw machine having an inlet, a forming vessel, and a pull roll assembly. The method also includes conveying the glass web over a steering device, where the steering device comprising a pivotable fluid injection bar and an edge detection device positioned proximate to an edge of the glass web. The method further includes determining a lateral position of an edge of the glass web and calculating automatically with at least one processor the lateral position of the glass based on a signal from the edge detection device. The method also includes pivoting the fluid injection bar of the steering device to shift the glass web in an inward direction when the edge detection device senses that the edge of the glass web is positioned outwardly offset from the pre-determined set point and conveying the glass web into a laser cutting device.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

DETAILED DESCRIPTION

Figure 1:
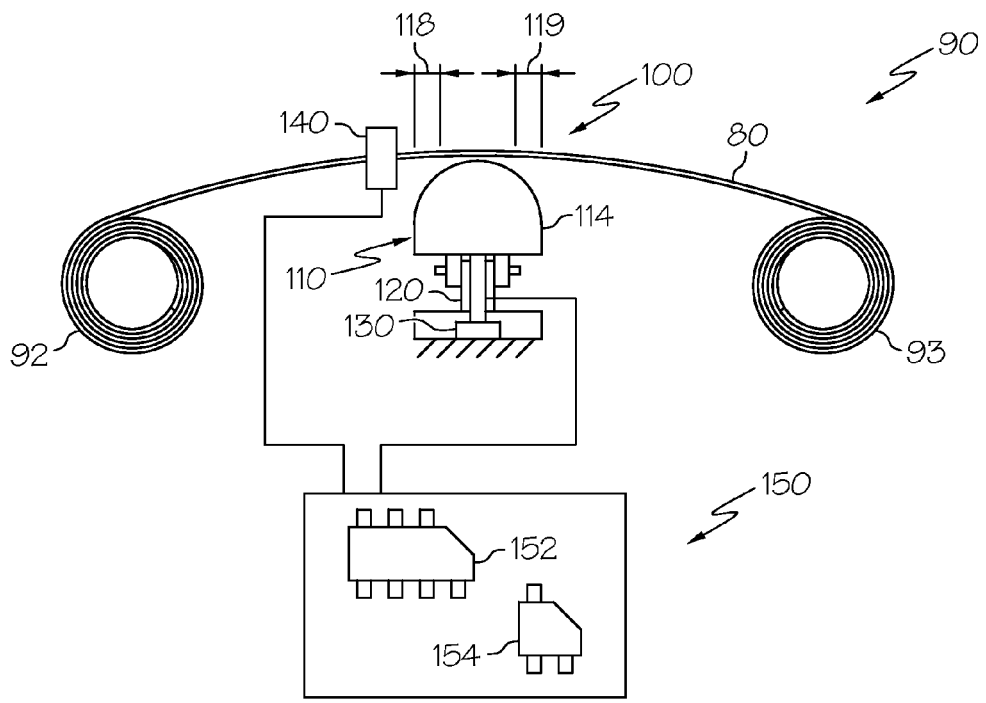
FIG. 1 schematically depicts a side view of a glass manufacturing apparatus having a steering device for controlling the lateral position of a glass web according to one or more embodiments shown or described herein.

Reference will now be made in detail to embodiments of apparatuses and methods for steering flexible glass webs as the glass webs are conveyed through various manufacturing operations. Whenever possible, the same reference numerals will be used throughout the drawings to refer to the same or like parts. In one embodiment, an apparatus for steering glass webs includes a fluid injection bar that injects fluid beneath the glass web to form a fluid cushion that supports the glass web and maintains a spacing of the glass web from the fluid injection bar. The fluid injection bar pivots to direct the glass web as the glass web progresses through the glass manufacturing operations. Methods and apparatuses for steering a glass web without contacting the glass web will be described in further detail herein with specific reference to the appended drawings.

While glass is generally known as a brittle material, inflexible and prone to scratching, chipping and fracture, glass having a thin cross section can in fact be quite flexible. Glass in long thin sheets or webs can be wound and un-wound from rolls, much like paper or plastic film. However, even though glass can be made flexible, it retains its brittle characteristic, and can be damaged by contact. Further, uneven coiling of the glass web on a roll is referred to as "telescoping" or "dishing" of the glass web on the roll. Telescoping of the glass web, as depicted by the glass web 80 positioned on the pay-out roll 92 in FIG. 2, may be caused by uneven tension in the glass web as the glass web is wound onto the roll. Telescoping of glass web on a roll may be attributed to angular and/or positional misalignment of components that control the winding process of the glass web, as well as twist of the glass web itself.

Dishing of glass webs on a roll may cause defects and/or breakage of the glass. For certain applications, particularly those for which visual defects can be distracting (e.g., display applications), even minor, seemingly cosmetic defects are unacceptable. For other applications requiring high mechanical strength, defects even less than 1 µm can limit the mechanical reliability of the glass web. Thus, handling of the glass webs during a manufacturing process, such as the deposition of thin film coatings onto the glass web, can become a source of loss and high cost.

Maintaining lateral alignment of the glass web as the glass web travels through the glass manufacturing equipment may be complicated by misalignment of components of the glass manufacturing equipment and "camber" (or twist) of the glass web itself. Additionally, instabilities, perturbations, vibrations, and transient effects that may exist in manufacturing environments or in processing and handling equipment may also cause intermittent or extended misalignment of the glass web in the lateral direction to occur. The apparatuses and methods described herein allow contact-free steering of the glass web as the glass web is fed through glass manufacturing and processing equipment. Steering the glass web corrects for any such misalignment or camber of the glass web and maintains lateral alignment of the glass web during manufacturing and processing operations.

Referring now to FIG. 1, an exemplary roll-to-roll process is schematically depicted according to one embodiment shown and described herein. The glass web source may include the glass web wound on a pay-out roll, as depicted in FIG. 1 and described below. However, as described below, other embodiments of the glass web source are contemplated including, without limitation, glass web formed from batch materials in a fusion process or a slot draw process. As the glass web is unwound from the pay-out roll, the unwound or dispensed portion can be processed, and then rewound on a take-up roll. In this context, the term "processed" can include any step subsequent to the formation of the glass, including but not limited to cleaning, slitting, laminating, or the deposition of additional layers and/or components (e.g. electrical/electronic components or portions thereof) on the glass. In addition, it is possible to perform similar processing of the flexible glass with sheet-fed roller systems.

Figure 2:
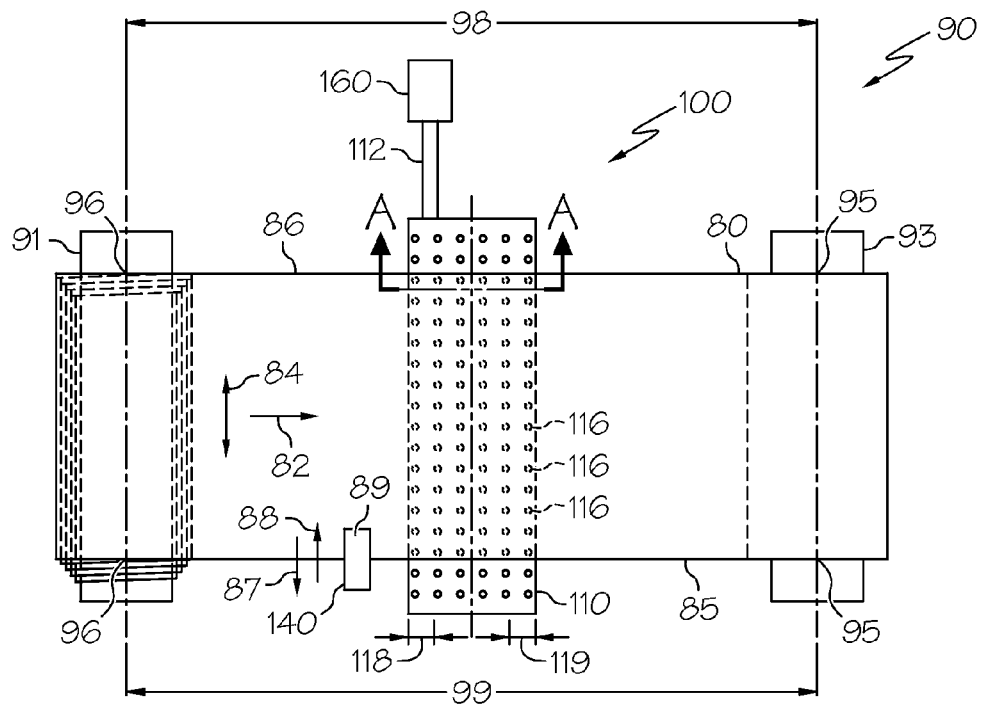
FIG. 2 schematically depicts a top view of a glass manufacturing apparatus having a steering device for controlling the lateral position of a glass web according to one or more embodiments shown or described herein.

FIGS. 1 and 2 schematically depict a glass manufacturing apparatus 90 that includes a steering device 100. The glass manufacturing apparatus 90 includes simplified representations of a pay-out roll 92, which introduces a glass web 80 to the glass manufacturing apparatus 90. Further, the glass manufacturing apparatus 90 includes a take-up roll 93, on which the glass web 80 is collected for removal from the glass manufacturing apparatus 90. While the glass manufacturing apparatus 90 depicts paying-out the glass web 80, passing the glass web over the steering device 100, and taking-in the glass web 80, it should be understood that steering devices 100 according to the present disclosure may be installed at any point along the manufacturing process.

Figure 3:
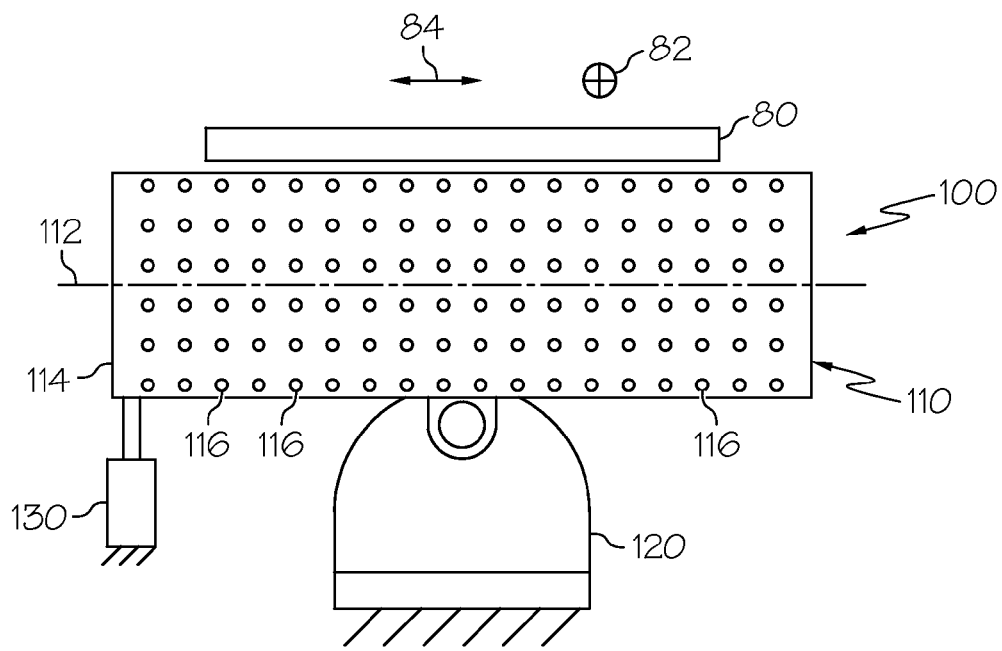
FIG. 3 schematically depicts a front view of a steering device for controlling the lateral position of a glass web according to one or more embodiments shown or described herein.

Referring to FIGS. 1-3, the glass web 80 is fed along the glass manufacturing apparatus 90 in a conveyance direction 82. The glass web 80 is generally transferred along the conveyance direction and does not translate in the cross direction 84 normal to the conveyance direction 82. The steering device 100 includes a fluid injection bar 110 having an elongate axis 112. The elongate axis 112 is oriented in the cross direction 84 of the glass web 80. The fluid injection bar 110 includes a plurality of openings 116 passing through a steering surface 114, such that the steering surface 114 is perforated by the openings 116. The openings 116 may be positioned at various locations along the steering surface 114. Further, the steering surface 114 may have a variety of shapes to accommodate steering the glass web at various positions along the glass manufacturing apparatus 90. In the embodiment depicted in FIGS. 1 and 2, the steering surface 114 is an arcuate surface (e.g. cylindrical) and the openings 116 are positioned with increased density at positions proximate to the introduction zone 118 and exit zone 119 of the glass web 80, and at decreased density at positions between the introduction zone 118 and the exit zone 119. A fluid delivery apparatus 160 is coupled to the fluid injection bar 110 and delivers fluid at an elevated pressure to the fluid injection bar 110.

Figure 4:
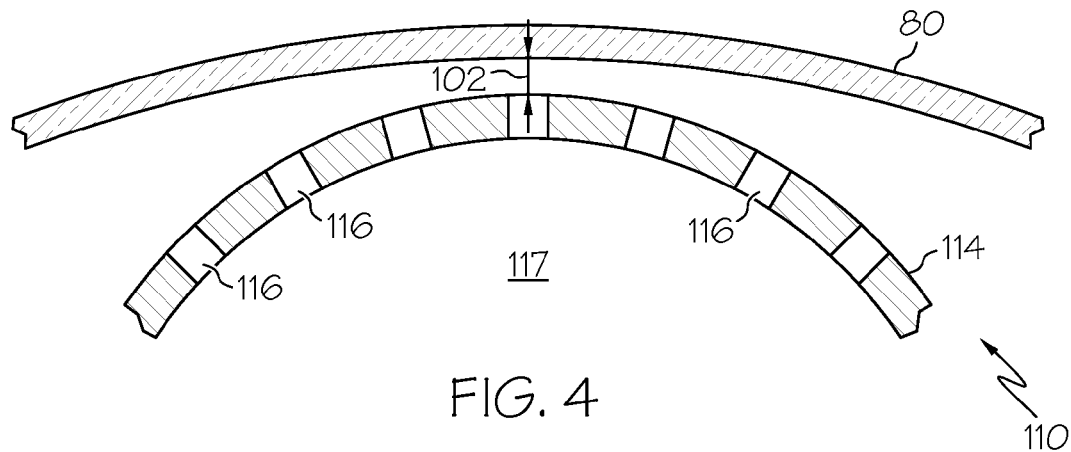
FIG. 4 schematically depicts a detailed side sectional view of a steering device and a glass web shown along line A-A of FIG. 2.

Referring to FIG. 4, the fluid injection bar 110 is shown in detail with the glass web 80. As depicted in FIG. 4, the fluid injection bar 110 includes a plurality of openings 116 passing through the steering surface 114. Fluid is introduced to the plenum volume 117 of the fluid injection bar 110 from the fluid delivery apparatus 160 (see FIG. 2). The fluid in the plenum volume 117 is maintained at a pressure above ambient pressure. The pressure differential between the fluid in the plenum volume 117 and the ambient pressure drive fluid out of the plenum volume 117 through the plurality of openings 116 as "jets." The jets of fluid ejected through the openings 116 impinge on the glass web 80, and provide a force that displaces the glass web 80 away from the steering surface 114. The glass web 80 is maintained at a "fly height" 102, or a distance apart from the steering surface 114. The fly height 102 may be set by design criteria to various distances. The fly height may be affected by various factors including, without limitation, the pressure and the volume of fluid delivered to the plenum volume 117 by the fluid delivery apparatus 160;

the weight of the glass web 80; and the tension in the conveyance direction on the glass web 80.

Referring again to FIGS. 1-3, the steering device 100 also includes a pivot bearing assembly 120 coupled to the fluid injection bar 110. The pivot bearing assembly 120 allows the fluid injection bar 110 to pivot in one plane and prevents the fluid injection bar 110 from pivoting in alternate planes. In the embodiment depicted in FIGS. 1-3, the pivot bearing assembly 120 allows the fluid injection bar 110 to pivot in a plane normal to conveyance direction 82 (i.e., pivots towards the glass web 80 at positions between the introduction zone 118 and the exit zone 119), while maintaining the orientation of the elongated axis 112 to the cross direction 84. In some embodiments, the pivot bearing assembly 120 is rigidly coupled to a support surface (e.g., coupled to the ground) to provide a stable base upon which the fluid injection bar 110 pivots.

The steering device 100 also includes an actuator 130 that controls the orientation of the fluid injection bar 110 about the pivot bearing assembly 120. In the embodiment depicted in FIGS. 1 and 3, the actuator 130 is coupled to the fluid injection bar 110 and to a support surface (e.g., ground). However, it should be understood that alternative embodiments are contemplated within the scope of the disclosure. The actuator 130 applies a force to the fluid injection bar 110 that controls the pivot rotation of the fluid injection bar 110 and maintains the position of the fluid injection bar 110 at the desired angle. The actuator 130 is positioned in the plane of rotation of the fluid injection bar 110. Further, the actuator 130 depicted in FIGS. 1 and 3 is positioned proximate to one side of the fluid injection bar 110 such that the portion of the fluid injection bar 110 positioned opposite the pivot bearing assembly 120 from the actuator 130 is cantilevered over the pivot bearing assembly 120. Any of various commercially available actuators may be used as the actuator 130 including electric actuators, electro-mechanical actuators, linear motors, or moving iron controllable actuators. The actuator 130 may include a servo to provide control of the actuator 130 through a feedback loop.

The steering device 100 further includes an edge detection device 140. The edge detection device 140 senses the position of a first edge 85 of the glass web 80. The edge detection device 140 evaluates a range of positions in which the first edge 85 of the glass web 80 may be located during the manufacturing operation. The detection device 140 provides a position signal that is indicative of the position of the first edge 85 of the glass web 80. In one embodiment, the detection device 140 may be a WideArray Edge Detector available from Accu-Web, Inc. of Madison, Wis. However, it should be understood that other similar detection devices may also be used.

The steering device 100 may also include an electronic controller 150. The electronic controller is communicatively coupled to the actuator 130 and the detection device 140. The electronic controller 150 may include a processor 152 and a memory 154. A computer readable instruction set stored in the memory 154 is executed by the processor, and automatically controls operation of the actuator 130 based on the position of the first edge 85 of the glass web 80 sensed by the edge detection device 140. For example, when the glass web 80 is positioned laterally offset outwards in a direction 87 from a pre-determined set point 89, the edge detection device 140 senses that the glass web 80 is laterally offset in direction 87. The electronic controller 150 recognizes that the glass web 80 is laterally offset in direction 87 based on a signal provided by the edge detection device 140. Based on this signal, the electronic controller 150 provides a command signal to the actuator 120 to extend or contract, thereby pivoting the fluid injection bar 110 in a plane normal to the conveyance direction 82 and shifting the glass web 80 in the inwards direction 88 away from the outwards direction 87. Similarly, when the glass web 80 is positioned laterally offset in the inwards direction 88 from a pre-determined set point 89, the edge detection device 140 senses that the glass web 80 is laterally offset in the inwards direction 88. The electronic controller 150 recognizes that the glass web 80 is laterally offset inwards 88 based on an output signal provided by the edge detection device 140. The electronic controller 150 provides a command to the actuator 120 to extend or retract thereby pivoting the fluid injection bar 110 in the plane normal to the conveyance direction 82 and shifting the glass web 80 in the outwards direction 87 away from the inwards direction 88. Because fluid is continuously directed to the plenum volume 117 of the fluid injection bar 110, the fluid continues to be ejected through the openings 116 in the steering surface 114 such that the fly height 102 (see FIG. 4) of the glass web 80 relative to the steering surface 114 is maintained, and contact between the glass web 80 and the steering surface 114 is prevented.

Referring in detail to FIG. 2, the glass manufacturing apparatus 90 is depicted with the glass web 80 that "telescopes" along the pay-out roll 92 and evenly spooled around the take-out roll 93. However, as discussed hereinabove, the steering device 100 according to the present disclosure may be incorporated into any glass manufacturing apparatus to control lateral shifting of the glass web 80. By pivoting the fluid injection bar 110, the steering device 100 modifies the distance that the glass web 80 must travel when moving across the steering device 100. The glass web 80 passing over the steering device 100 defines a first edge path length 98 evaluated along the first edge 85 of the glass web 80, measured from the tangent pay-out point 96 of the pay-out roll 92 to the tangent take-in point 95 of the take-in roll 93. Similarly, the glass web 80 defines a second edge path length 99 evaluated along the second edge 86 of the glass web 80, measured from the tangent pay-out point 96 of the pay-out roll 92 to the tangent take-in point 95 of the take-in roll 93.

For the glass to track evenly along the glass manufacturing apparatus 90 and properly coil on the take-in roll 93, the steering device 100 is pivoted such that the first edge path length 98 is equal to the second edge path length 99, as the glass web 80 is transferred through the glass manufacturing apparatus 90. By pivoting the fluid injection bar 110 an appropriate amount about the pivot bearing assembly 120, the fluid injection bar 110 increases one of the first or second edge path length 98, 99, and shortens the opposite of the first or second edge path length 98, 99. Modifying the relative lengths of the first and second edge path length 98, 99 allows the steering device 100 to direct the glass web 80 in a lateral direction corresponding to the cross direction 84. As such, even tracking of the glass web 80 within the glass manufacturing apparatus 90, as well as even coiling of the glass web 80 onto the take-in roll 93, is controlled.

While specific mention has been made hereinabove to a glass manufacturing apparatus 90 that incorporates a pay-out roll 92 and a take-in roll 93, it should be understood that additional processing equipment may be incorporated along the glass manufacturing apparatus 90. Further, multiple steering devices 100 may be incorporated into a glass manufacturing apparatus 90 at various positions. In particular, steering devices 100 may be incorporated into a glass manufacturing apparatus 90 at positions proximate to particular manufacturing operations, such as, for example, trimming of edges of the glass web 80, applying components to the glass web 80, and coiling the glass web 80 onto a take-in roll 93.

Figure 5:
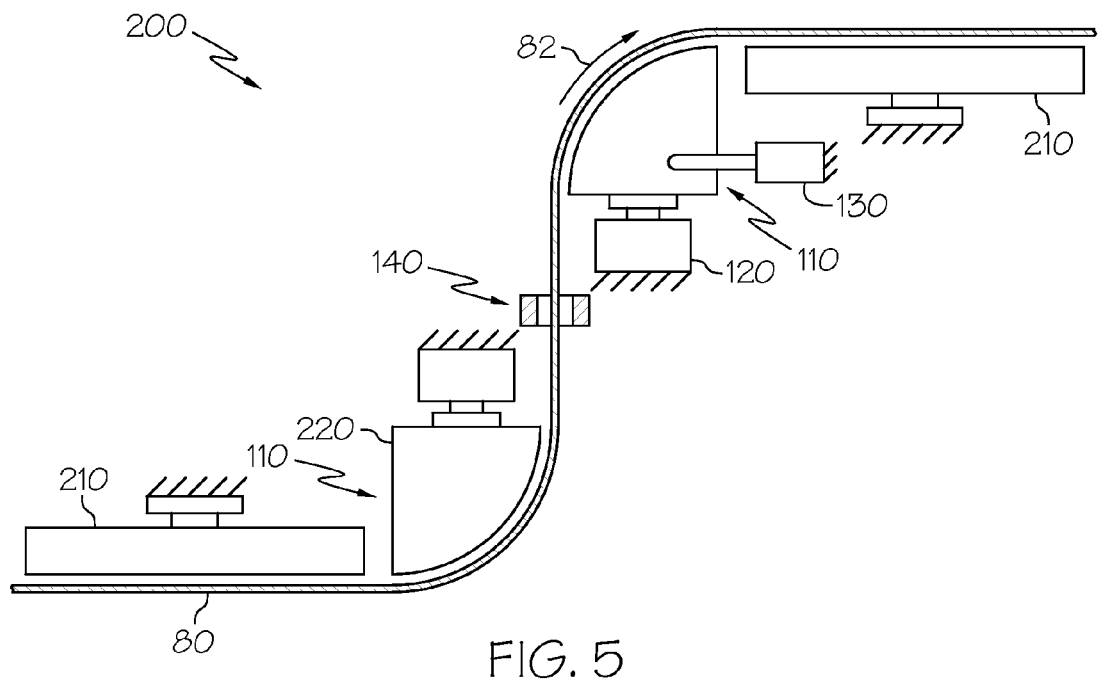
FIG. 5 schematically depicts a side view of a glass manufacturing apparatus having a steering device for controlling the lateral position of a glass web according to one or more embodiments shown or described herein.
Figure 6:
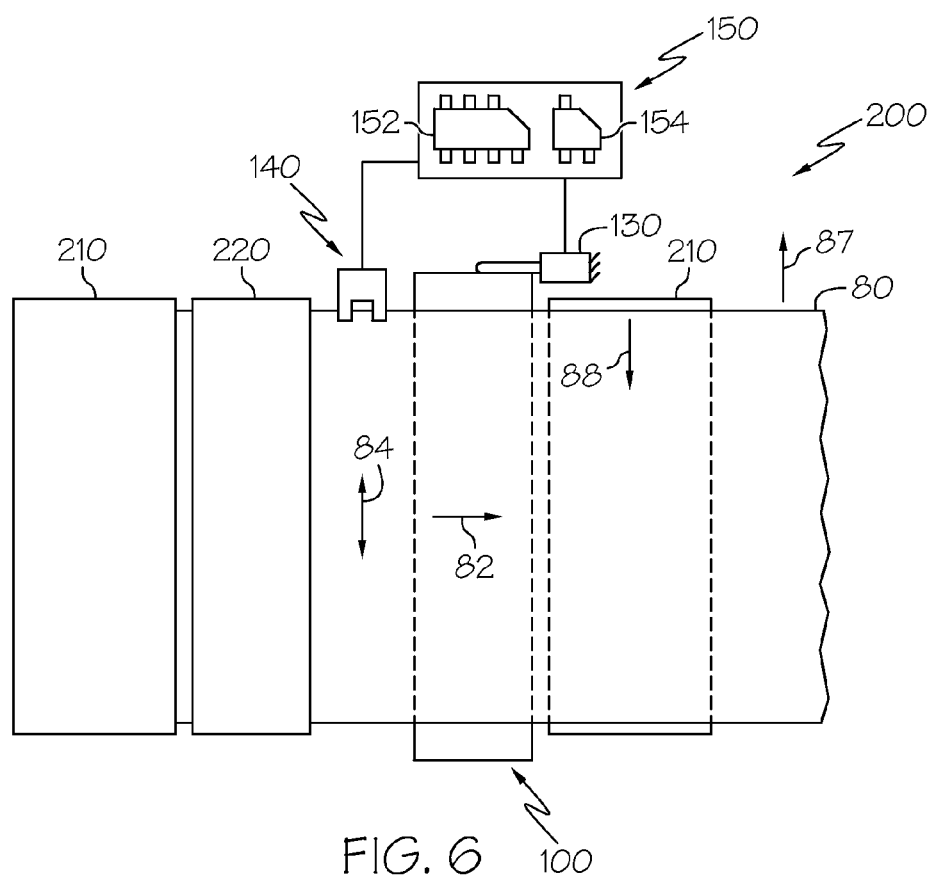
FIG. 6 schematically depicts a top view of a glass manufacturing apparatus having a steering device for controlling the lateral position of a glass web according to one or more embodiments shown or described herein.

Referring now to FIGS. 5 and 6, another embodiment of a glass manufacturing apparatus 200 is depicted. In this embodiment, the steering device 100 is incorporated into the glass manufacturing apparatus 200 at a position at which the glass web 80 undergoes a vertical change in height, but continues to be conveyed in the same direction. To change the vertical height of the glass web 80, the glass manufacturing apparatus includes two steering reverses, between which the glass web 80 moves vertically, and outside of which the glass web 80 translates in a generally planar orientation in the conveyance direction 82. Modifying the orientation of the glass web 80 within such a configuration may lead to lateral shifting of the glass web 80 due to misalignment of components of the glass manufacturing apparatus 200.

To correct for this misalignment, the glass manufacturing apparatus 200 includes planar fluid injection bars 210, which maintain the fly height 102 of the glass web 80, as discussed hereinabove. The glass manufacturing apparatus 200 also includes a static reverser 220, which includes a fluid injection bar 110 similar to that discussed hereinabove in regard to FIGS. 1-4, however, the fluid injection bar 110 of the static reverser 220 is maintained in a fixed position.

The glass manufacturing apparatus 200 further includes a steering device 100 having a fluid injection bar 110 that pivots along a pivot bearing assembly 120. Pivot of the fluid injection bar 110 is controlled by an actuator 130 coupled to the fluid injecting bar 110. The steering device 100 also includes an edge detection device 140 that evaluates the position of one edge of the glass web 80. The actuator 130 and the edge detection device 140 are communicatively coupled to an electronic controller 150 having a processor 152 and a memory 154. A computer readable instruction set is stored in the memory 154 and, when executed by the processor 152, determines the lateral position of the edge of the glass web 80, calculates whether the edge of the glass web 80 is offset in an inwards direction 88 or offset in an outwards direction 87 from a pre-determined set point. Based on the signal from the edge detection device 140, the processor 152 may command the actuator 130 to extend or retract pivoting the fluid injection bar 110 thereby controlling the lateral position of the glass web 80.

Similar to previously described embodiments, the fluid injection bar 110 pivots along the pivot bearing assembly in a plane normal to the conveyance direction 82. In the embodiment depicted in FIGS. 5 and 6, because the path of the glass web 80 curves, the pivot bearing assembly 120 may be positioned in any of a number of orientations along the conveyance direction 82 such that the fluid injection bar 110 pivots in a plane perpendicular to the conveyance direction 82 evaluated at any of the instantaneous positions of the glass web 80.

Figure 7:
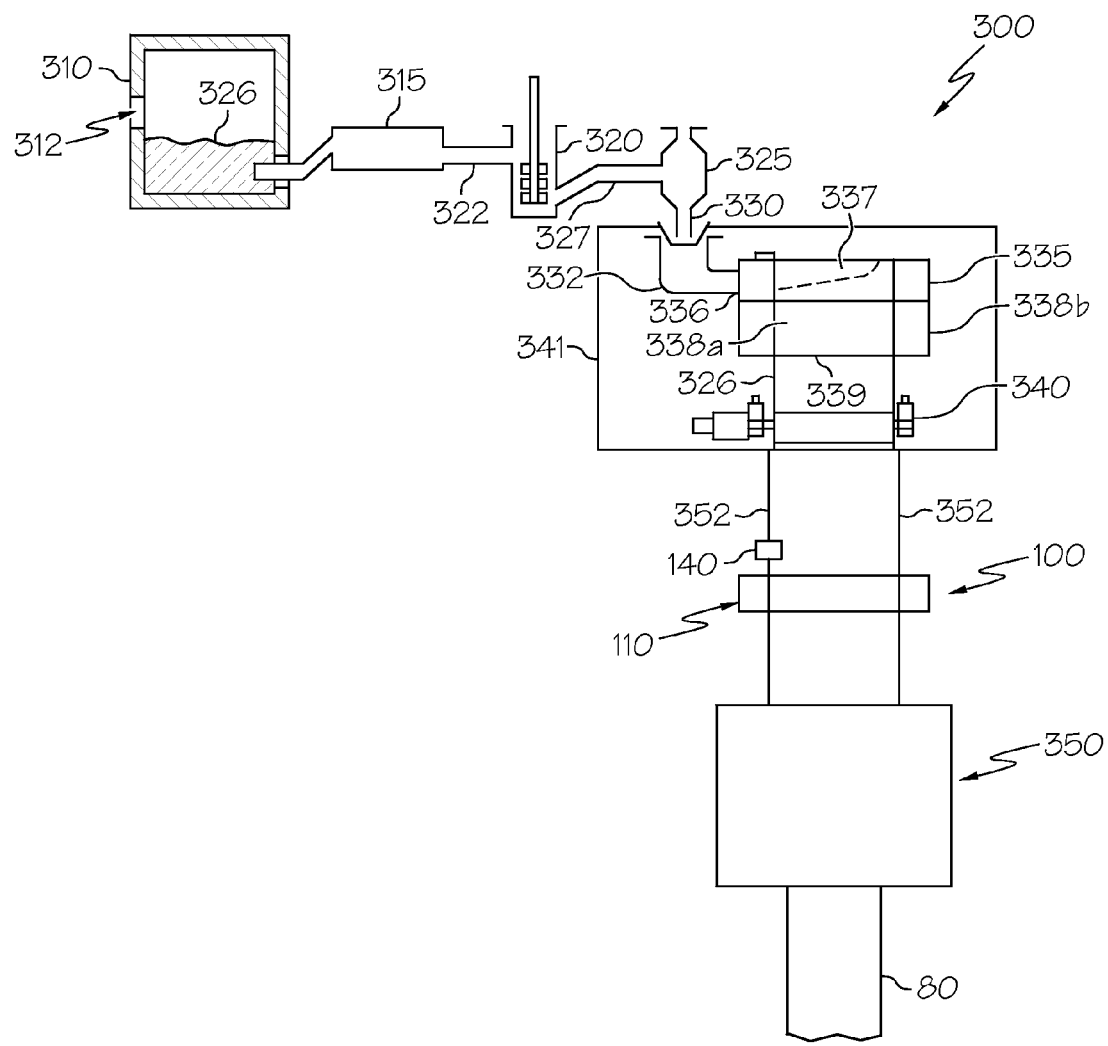
FIG. 7 schematically depicts a glass production apparatus including a steering device according to one or more embodiments shown or described herein.

While the methods and apparatuses for steering flexible glass webs described herein may be used in roll-to-roll processing of glass substrates, it should be understood that other applications are contemplated. As depicted in FIG. 7, the methods and apparatuses for steering glass webs may be used in conjunction with a glass production apparatus 300 that produces a glass web 80, from glass batch materials. The glass production apparatus 300 may include a melting vessel 310, a fining vessel 315, a mixing vessel 320, a delivery vessel 325, and a fusion draw machine (FDM) 341. Glass batch materials are introduced into the melting vessel 310 as indicated by arrow 312. The batch materials are melted to form molten glass 326. The fining vessel 315 has a high temperature processing area that receives the molten glass 326 from the melting vessel 310 and in which bubbles are removed from the molten glass 326. The fining vessel 315 is fluidly coupled to the mixing vessel 320 by a connecting tube 322. The mixing vessel 320 is, in turn, fluidly coupled to the delivery vessel 325 by a connecting tube 327.

The delivery vessel 325 supplies the molten glass 326 through a downcomer 330 into the FDM 341. The FDM 341 comprises an inlet 332, a forming vessel 335, and a pull roller assembly 340. As shown in FIG. 7, the molten glass 326 from the downcomer 330 flows into the inlet 332 which leads to the forming vessel 335. The forming vessel 335 includes an opening 336 that receives the molten glass 326 which flows into a trough 337 and then overflows and runs down two sides 338a and 338b before fusing together below a root 339. The two sides 338a and 338b of the forming vessel 335 come together such that the two overflow walls of molten glass 326 rejoin (e.g., fuse) before being drawn downward by the pull roller assembly 340 to form the glass web 80. As the glass web 80 remains in a viscous or visco-elastic state, the glass web 80 is prone to dimensional variations. To control the dimensional variation of the glass web 80, the pull roller assembly 340 "draws" the glass web 80, or applies tension to the glass web 80 as the glass web 80 continues to form from the forming vessel 335. As such, as used herein, "draw" refers to moving the glass web 80 through a glass production apparatus 300 while the glass web 80 is in a viscous or visco-elastic state. The glass web 80 goes through a visco-elastic transition in a "setting zone" in which the stress and flatness are set into the glass web 80, and the glass web 80 transitions to a more elastic state.

As the glass web 80 exits the pull roller assembly 340, the glass web 80 is in an elastic state. In one embodiment, after the glass web 80 passes through the setting zone, the glass web 80 may be conveyed into a cutting device, such as a laser cutting device 350, which removes thickened edge beads 352 formed on the glass web 80 during the formation process. The laser cutting device 350 removes the edge beads 352 by laser separation. The lateral location of the glass web 80 is controlled by a steering device 100 such that accurate removal of the edge beads 352 can be achieved.

As the glass web 80 exits the pull roller assembly 340 in the conveyance direction 82, the glass web 80 is directed to pass over the steering device 100. The steering device includes an edge detection device 140 that determines the lateral position of the edge of the glass web 80. The fluid injection bar 110 of the steering device 100 is pivoted such that the lateral position of the glass web 80 is maintained and evenly controlled as the glass web 80 enters the laser cutting device 350 for trimming of the edge beads 352.

It should now be understood that steering devices according to the present disclosure may be incorporated into glass manufacturing apparatuses to control the lateral position of a glass web as it is processed through the glass manufacturing apparatus. The steering devices include fluid injection bars that eject fluid to create a cushion between the steering surface and the glass web. An electronic controller automatically modifies an actuator to control the pivot of the fluid injection bar to maintain a desired lateral position of the glass web passing through the glass manufacturing apparatus. Control of the lateral position of the glass web without contacting the glass web may assist with minimizing generation of defects in the glass web itself.

In a first aspect, the disclosure provides a steering device for non-contact steering of a glass web having a conveyance direction and a cross direction normal to the conveyance direction, the steering device comprising: a fluid injection bar having an elongate axis oriented in a cross direction of the glass web; a pivot bearing assembly coupled to the fluid injection bar such that the fluid injection bar is pivotable in a plane perpendicular to the conveyance direction of the glass web; an actuator coupled to the fluid injection bar for adjusting the orientation of the fluid injection bar with respect to the glass web; and an edge detection device positioned proximate to an edge of the glass web for evaluating a position of the edge of the glass web in the cross direction.

In a second aspect, the disclosure provides a method of steering a glass web comprising: directing the glass web along a glass manufacturing apparatus in a conveyance direction, the glass web having a cross direction normal to the conveyance direction; conveying the glass web over a steering device, the steering device comprising a pivotable fluid injection bar and an edge detection device positioned proximate to an edge of the glass web; determining a lateral position of the edge of the glass web; calculating automatically with at least one processor the lateral position of the glass web based on a signal received from the edge detection device; and pivoting the fluid injection bar of the steering device to shift the glass web in an inward direction when the edge detection device senses that the edge of the glass web is positioned outwardly offset from the pre-determined set point.

In a third aspect, the disclosure provides a method for producing a glass web comprising: melting glass batch materials to form molten glass; forming the molten glass into the glass web with a fusion draw machine comprising an inlet, a forming vessel, and a pull roll assembly; drawing the glass web through the pull roll assembly; conveying the glass web over a steering device, the steering device comprising a pivotable fluid injection bar and an edge detection device positioned proximate to an edge of the glass web; determining a lateral position of the edge of the glass web; calculating automatically with at least one processor the lateral position of the glass web based on a signal from the edge detection device; pivoting the fluid injection bar of the steering device to shift the glass web in an inward direction when the edge detection device senses that the edge of the glass web is positioned outwardly offset from the pre-determined set point; and conveying the glass web into a laser cutting device.

In a fourth aspect, the disclosure provides the steering device of the first through third aspects, further comprising an electronic controller communicatively coupled to the actuator and the edge detection device, the electronic controller comprising a processor and a memory storing a computer readable instruction set, wherein the electronic controller executes the computer readable instruction set to: evaluate the position of the edge of the glass web with the edge detection device; and command the actuator to extend or to contract as to modify the orientation of the fluid injection bar based on the position of the edge of the glass web such that the glass web is positioned in a lateral direction with respect to a pre-determined set point.

In a fifth aspect, the disclosure provides the steering device of the first through fourth aspects, further comprising a fluid delivery apparatus in fluid communication with the fluid injection bar to provide fluid to the fluid injection bar.

In a sixth aspect, the disclosure provides the steering device of the first through fifth aspects, wherein the fluid injection bar comprises a steering surface positioned proximate to the glass web, the steering surface comprising a plurality of openings that perforate the steering surface, and allow injection of fluid between the steering surface and the glass web.

In a seventh aspect, the disclosure provides the steering device of the first through sixth aspects, wherein the steering surface is cylindrical.

In an eighth aspect, the disclosure provides the steering device of the first through seventh aspects, wherein the actuator is selected from the group consisting of an electric actuator, an electro-mechanical actuator, a linear motor, and a moving iron controllable actuator.

In a ninth aspect, the disclosure provides the steering device of the first through eighth aspects, wherein a portion of the fluid injection bar is cantilevered away from the pivot bearing assembly in a direction opposite the actuator.

In a tenth aspect, the disclosure provides the methods of the second through third aspects, further comprising pivoting the fluid injection bar of the steering device to shift the glass web in an outward direction when the edge detection device senses that the edge of the glass web is positioned inwardly offset from the pre-determined set point.

In an eleventh aspect, the disclosure provides the methods of the second through third and tenth aspects, wherein the fluid injection bar of the steering device injects a fluid between the glass web and a steering surface such that the glass web is supported over and spaced apart from the steering surface.

In a twelfth aspect, the disclosure provides the methods of the second through third and tenth through eleventh aspects, wherein: the glass web defines a first edge path length and a second edge path length as the glass web is directed along the glass manufacturing apparatus in the conveyance direction; and pivoting the fluid injection bar with respect to the glass manufacturing apparatus such that the first edge path length is the same as the second edge path length.

In a thirteenth aspect, the disclosure provides the methods of the second through third and tenth through twelfth aspects, wherein the steering device further comprises a pivot bearing assembly coupled to the fluid injection bar such that the fluid injection bar is pivotable in a plane perpendicular to the conveyance direction of the glass web and an actuator coupled to the fluid injection bar for adjusting the orientation of the fluid injection bar with respect to the glass web.

In a fourteenth aspect, the disclosure provides the methods of the second through third and tenth through thirteenth aspects, wherein the fluid injection bar has an elongate axis oriented in a cross direction of the glass web that is normal to the conveyance direction.

In a fifteenth aspect, the disclosure provides the method of the third aspect, further comprising separating edge beads from the glass web with the laser cutting device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of steering a glass web comprising:
   directing the glass web along a glass manufacturing apparatus in a conveyance direction, the glass web having a cross direction normal to the conveyance direction;
   conveying the glass web over a steering device, the steering device comprising a pivotable fluid injection bar and an edge detection device positioned proximate to an edge of the glass web;

sensing a lateral position of a first edge of the glass web with the edge detection device and providing a position signal indicative of the position the first edge;

calculating automatically with at least one processor the lateral position of the glass web based on the signal received from the edge detection device; and pivoting the fluid injection bar of the steering device to shift the glass web in an inward direction when the edge detection device senses that the edge of the glass web is positioned outwardly offset from a pre-determined set point, or pivoting the fluid injection bar of the steering device to shift the glass web in an outward direction when the edge detection device senses that the edge of the glass web is positioned inwardly offset from the pre-determined set point.

2. The method of claim 1, wherein the fluid injection bar of the steering device injects a fluid between the glass web and a steering surface such that the glass web is supported over and spaced apart from the steering surface.

3. The method of claim 1, wherein:

the glass web defines a first edge path length and a second edge path length as the glass web is directed along the glass manufacturing apparatus in the conveyance direction; and pivoting the fluid injection bar with respect to the glass manufacturing apparatus such that the first edge path length is the same as the second edge path length.

4. The method of claim 1, wherein the steering device further comprises a pivot bearing assembly coupled to the fluid injection bar such that the fluid injection bar is pivotable in a plane perpendicular to the conveyance direction of the glass web and an actuator coupled to the fluid injection bar for adjusting the orientation of the fluid injection bar with respect to the glass web.

5. The method of claim 1, wherein the fluid injection bar has an elongate axis oriented in a cross direction of the glass web that is normal to the conveyance direction.

6. A method for producing a glass web comprising:

melting glass batch materials to form molten glass;

forming the molten glass into the glass web with a fusion draw machine comprising an inlet, a forming vessel, and a pull roll assembly;

drawing the glass web through the pull roll assembly;

conveying the glass web over a steering device, the steering device comprising a pivotable fluid injection bar and an edge detection device positioned proximate to an edge of the glass web;

sensing a lateral position of a first edge of the glass web with the edge detection device and providing a position signal indicative of the position the first edge;

calculating automatically with at least one processor the lateral position of the glass web based on the signal from the edge detection device;

pivoting the fluid injection bar of the steering device to shift the glass web in an inward direction when the edge detection device senses that the edge of the glass web is positioned outwardly offset from the pre-determined set point, or pivoting the fluid injection bar of the steering device to shift the glass web in an outward direction when the edge detection device senses that the edge of the glass web is positioned inwardly offset from the pre-determined set point; and conveying the glass web into a laser cutting device.

7. The method of claim 6, wherein the molten glass flows over two sides of the forming vessel and fuses at a root thereof to form the glass web.

8. The method of claim 6, wherein the fluid injection bar of the steering device injects a fluid between the glass web and a steering surface of the fluid injection bar such that the glass web is supported over and spaced apart from the steering surface.

9. The method of claim 6, further comprising separating edge beads from the glass web with the laser cutting device.

* * * * *